United States Patent
Khatwa et al.

(10) Patent No.: US 8,395,541 B2
(45) Date of Patent: Mar. 12, 2013

(54) ENHANCED ALERTING OF CHARACTERISTIC WEATHER HAZARDS

(75) Inventors: Ratan Khatwa, Sammamish, WA (US); Santosh Mathan, Seattle, WA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 12/260,653

(22) Filed: Oct. 29, 2008

(65) Prior Publication Data

US 2010/0103029 A1    Apr. 29, 2010

(51) Int. Cl.
- G01S 13/95 (2006.01)
- G01S 13/89 (2006.01)
- G01S 13/00 (2006.01)

(52) U.S. Cl. ......... 342/26 B; 342/26 R; 342/89; 342/90; 342/175; 342/176; 342/179; 342/195; 702/1; 702/2; 702/3

(58) Field of Classification Search ....... 342/26 R–26 D, 342/89, 90, 175, 176, 179–182, 190–197; 702/1–4
See application file for complete search history.

(56) References Cited

U.S. PATENT DOCUMENTS

| | | | | |
|---|---|---|---|---|
| 4,613,938 A * | 9/1986 | Hansen et al. | | 702/3 |
| 4,728,952 A * | 3/1988 | Residois | | 342/26 D |
| 5,757,322 A * | 5/1998 | Ray et al. | | 342/26 D |
| 5,796,611 A * | 8/1998 | Ochiai et al. | | 702/3 |
| 6,177,873 B1 * | 1/2001 | Cragun | | 702/3 |
| 6,597,305 B2 * | 7/2003 | Szeto et al. | | 342/26 R |
| 6,650,275 B1 * | 11/2003 | Kelly et al. | | 342/26 R |
| 6,670,908 B2 * | 12/2003 | Wilson et al. | | 342/26 R |
| 6,677,886 B1 * | 1/2004 | Lok | | 342/26 R |
| 6,882,302 B1 * | 4/2005 | Woodell et al. | | 342/26 R |
| 7,109,913 B1 | 9/2006 | Paramore et al. | | |
| 7,231,300 B1 * | 6/2007 | Rose, Jr. | | 702/3 |
| 7,292,178 B1 * | 11/2007 | Woodell et al. | | 342/26 B |
| 7,307,576 B1 * | 12/2007 | Koenigs | | 342/26 R |
| 7,417,579 B1 * | 8/2008 | Woodell | | 342/26 B |
| 7,486,219 B1 * | 2/2009 | Woodell et al. | | 342/26 B |
| 7,492,305 B1 * | 2/2009 | Woodell et al. | | 342/26 B |
| 7,515,088 B1 * | 4/2009 | Woodell et al. | | 342/26 B |
| 2006/0097907 A1 * | 5/2006 | Fischer et al. | | 342/26 R |
| 2007/0063875 A1 | 3/2007 | Hoffberg | | |
| 2008/0165051 A1 | 7/2008 | Khatwa | | |

OTHER PUBLICATIONS

Peters, J.F. et al., Classification of meteorological volumetric radar data using rough set methods, 2002 Elsevier Science B.V., Pattern Recognition Letters 24 (2003) 911-920. Available www.ComputerScienceWeb.com.

* cited by examiner

Primary Examiner — Bernarr Gregory
(74) Attorney, Agent, or Firm — Lowe Graham Jones PLLC

(57) ABSTRACT

A method of providing weather radar images to a flight crew of an aircraft includes obtaining raw volumetric radar data corresponding to at least one signal reflected off of a weather system. Based on the radar data, the weather system is computationally classified as being of a first type of a plurality of weather-system types. After classifying the weather system, the radar data is image processed, the image processing yielding an image representing the weather system and corresponding to the first weather-system type. The image is displayed on a display device.

20 Claims, 5 Drawing Sheets

U-SHAPE　　　　　　　　　　FINGER

SCALLOPED EDGE　　　　　　HOOK

ENHANCED ALERTING OF CHARACTERISTIC WEATHER HAZARDS

BACKGROUND OF THE INVENTION

Weather has been identified as a cause or contributing factor to many aviation accidents and fatalities. Accidents can occur when a chain of events leads to a failure of an aircraft system, a mistake on part of the crew piloting the aircraft, or a combination thereof. Improved levels of weather information and the use of pilot decision aids may be helpful in breaking the chain of events that leads to an accident.

It is known that when using conventional weather radar systems, both the shape of storm cells and reflectivity levels are indicators of significant weather threats. Pilot training normally includes familiarization of characteristic weather cell shapes displayed in two-dimensions that may imply significant weather threats. Examples include (some of which are illustrated in FIG. 1):

U-shapes;
thin protruding fingers;
scalloped edges;
hooks;
V-notch;
pendant;
steep rain gradients;
line echo wave pattern; and
bow shaped line of echoes.

These cells are generally associated with conditions such as unstable air masses, hail and tornadoes and should be avoided.

Flight crews are currently required to visually detect these types of weather threats, an exercise that can be extremely challenging given the workload of the flight crew during flight, particularly during terminal area operations.

SUMMARY OF THE INVENTION

In an embodiment, a method of providing weather radar images to a flight crew of an aircraft includes obtaining raw volumetric radar data corresponding to at least one signal reflected off of a weather system. Based on the radar data, the weather system is computationally classified as being of a first type of a plurality of weather-system types. After classifying the weather system, the radar data is image processed, the image processing yielding an image representing the weather system and corresponding to the first weather-system type. The image is displayed on a display device.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Embodiments of the invention employ processing of 3-D radar reflectivity data and data-pattern recognition techniques to detect and identify hazardous weather conditions on the basis of volumetric radar data. Previous approaches, such as that described in U.S. Pat. No. 6,650,275, have focused on processing of radar image data in two dimensions. In an embodiment, reflected data is not image processed prior to classifying the nature and/or severity of a weather system.

Figure 1:
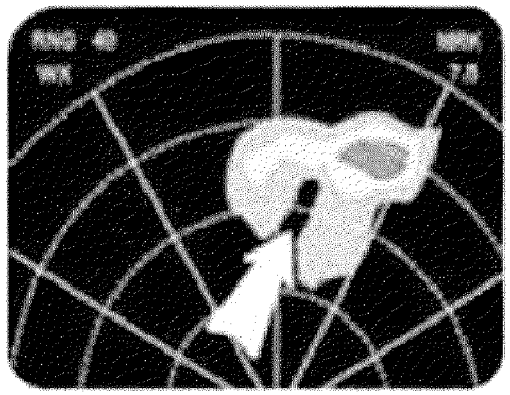
FIG. 1 illustrates display characteristics of known hazardous weather conditions.
Figure 1:
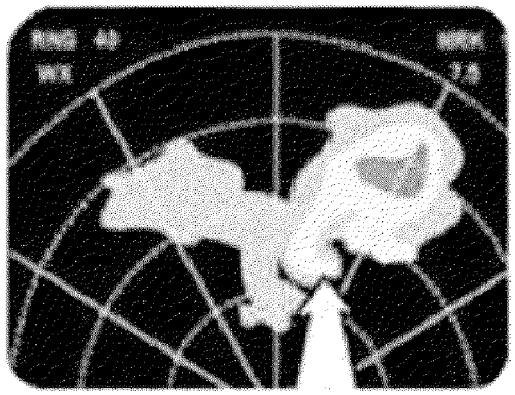
Figure 1:
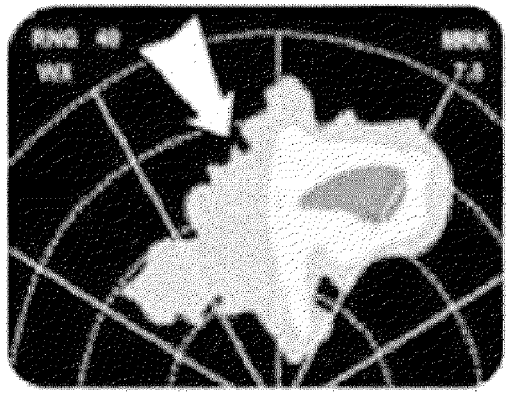
Figure 1:
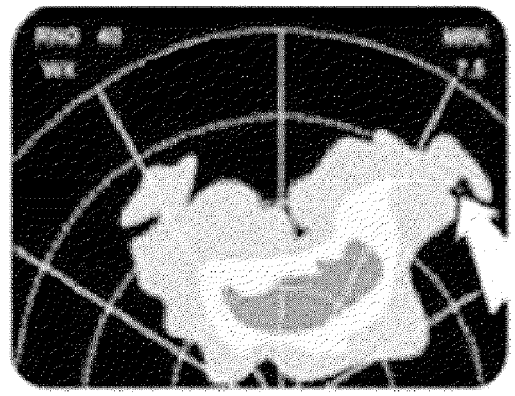
Figure 2:
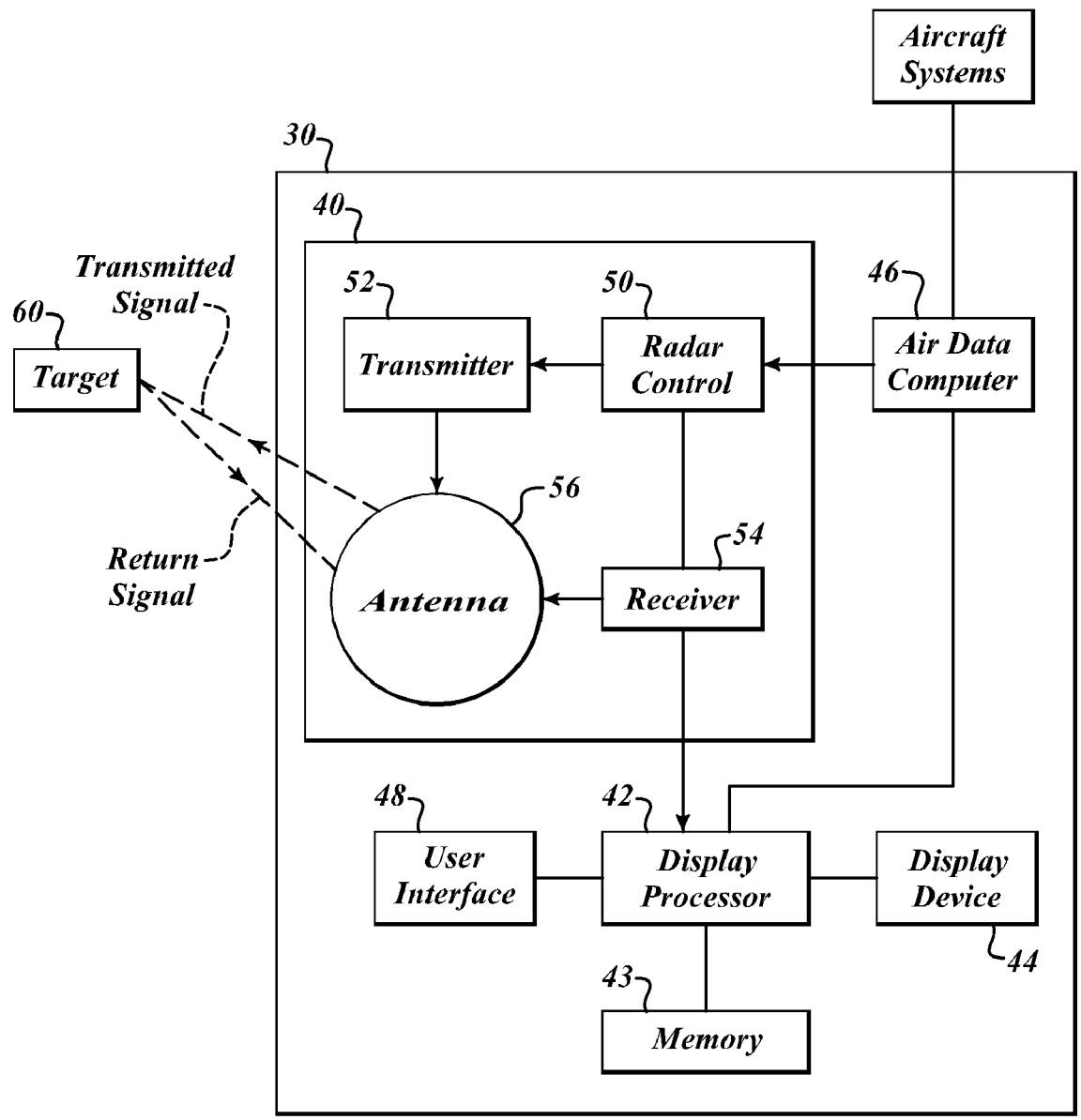
FIG. 2 illustrates an exemplary system formed in accordance with an embodiment of the present invention.

FIG. 2 illustrates an example of a suitable operating environment in which the invention may be implemented. The operating environment is only one example of a suitable operating environment and is not intended to suggest any limitation as to the scope of use or functionality of the invention. The operating environment may include or be a component of a three-dimensional buffer processing system, such as the RDR-4000 weather radar system manufactured by Honeywell®, including its volumetric buffer technology. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

The operating environment illustrated in FIG. 2 typically includes at least some form of computer readable media. Computer readable media can be any available media that can be accessed by one or more components of such operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by one or more components of such operating environment. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

Embodiments of the invention include a system, method, and computer program product for alerting a pilot of hazardous weather conditions at high altitude. FIG. 2 illustrates an exemplary system 30 formed in accordance with an embodiment of the present invention. The system 30 includes a weather radar system 40, a display processor 42, memory 43, a display device 44, an air data computer 46, and user interface 48 coupled to the display processor 42. The display processor 42 is electrically coupled to the radar system 40, the display device 44, the air data computer 46, and the memory 43.

An embodiment of the radar system 40 includes a radar controller 50, a transmitter 52, a receiver 54, and an antenna 56. The radar controller 50 controls the transmitter 52 and the receiver 54 for performing the sending and receiving of signals through the antenna 56 based on aircraft data (i.e., position, heading, roll, yaw, pitch, etc.) received from the air data computer 46, a Flight Management System (FMS), Inertial Navigation System (INS), and/or Global Positioning System (GPS).

The air data computer 46 generates air data based on signals received from various aircraft flight systems. The radar system 40 transmits radar signals from the antenna 56 into space and receives return signals (reflectivity values) if a target 60, such as a storm cell, is contacted by the transmitted radar signal. Preferably, the radar system 40 digitizes the return signals and sends the digitized signals to the display processor 42. The display processor 42 translates the received return signals for storage in a three-dimensional buffer in the memory 43. The display processor 42 then generates a two-dimensional image for presentation on the display device 44 based on any control signals sent from the user interface 48 or based on settings within the processor 42. In alternative embodiments, the image may be in three dimensions, in a plan-view-image format, or presented on a vertical situation display (VSD).

The translated return signals (return data), as determined by the radar system 40 or processor 42, identify certain weather targets, such as rain/moisture, windshear, or turbulence. The type of weather target identified is based on a corresponding present algorithmic interpretation of the reflectivity values. The pilot can select the type of weather identified using the user interface 48, or such weather type may be automatically displayed. The pilot may also be able to control range, gain, and display mode (e.g., AUTO weather, MANUAL weather, MAP mode).

In an embodiment, the system 30 continuously scans the entire three-dimensional space in front of the aircraft, and stores all reflectivity data in an earth-referenced three-dimensional (or "volumetric") memory buffer. This buffer is continuously updated with reflectivity data from new scans. The reflectivity data is extracted from the buffer to generate the desired display views without having to make (and wait for) view-specific antenna scans. With the three-dimensional volumetric buffer data, the display presentation is not constrained to a single tilt-plane that is inherent to conventional radar. The reflectivity data in the volumetric buffer is subjected to pattern recognition techniques discussed below.

In an embodiment, recognizing hazardous weather conditions on the basis of volumetric radar data may be accomplished using a function that can map real-valued, stochastic radar data into a variety of known hazard categories. The appropriate mapping function can be empirically constructed using statistical machine learning techniques.

In an embodiment, several pre-processing steps may be performed to appropriately condition the reflectivity data. First, data contaminated by noise artifacts can be corrected, or rejected, using signal processing techniques. Second, volumetric radar data features can be normalized so that differences in the dynamic range of various weather-system features do not negatively affect the classifier function (discussed in greater detail below). An exemplary set of such analyzed weather-system features is shown in, and discussed with reference to, Table 1 of "Classification of Meteorological Volumetric Radar Data Using Rough Set Methods," J. F. Peters, et al., *Pattern Recognition Letters* 24 (2003) 911-920, which is hereby incorporated by reference in its entirety. Third, dimensionality reduction techniques, such as, for example, principal component analysis or Fisher discriminant analysis, can be used to eliminate redundant features in the data. Such reduction techniques can be used to identify and retain features that account for most of the variance in the data.

As above alluded to, pre processed training data can be used to construct classifier functions that can map radar returns to hazard categories of interest. Two broad categories of classifier functions can be used: generative models or discriminative models. Generative models represent the distribution of features associated with each class of hazards. Discriminative models represent the boundaries between classes of hazards. The model construction process may employ a set of training labels that relate sample radar-return patterns of weather-system features, as described above, to hazard categories. These labels may be based on empirically observed objective meteorological measurements and/or the judgment of one or more human observers. Once constructed, classifier functions can estimate the likelihood of a given radar return sample belonging to a certain hazard category of interest.

Since radar features are stochastic variables that are affected by environmental perturbations and measurement error, radar samples may be occasionally misclassified. To minimize the impact of these errors, in an embodiment, outputs from the classifier function may be smoothed over various time windows to dampen error perturbations.

Figure 3:
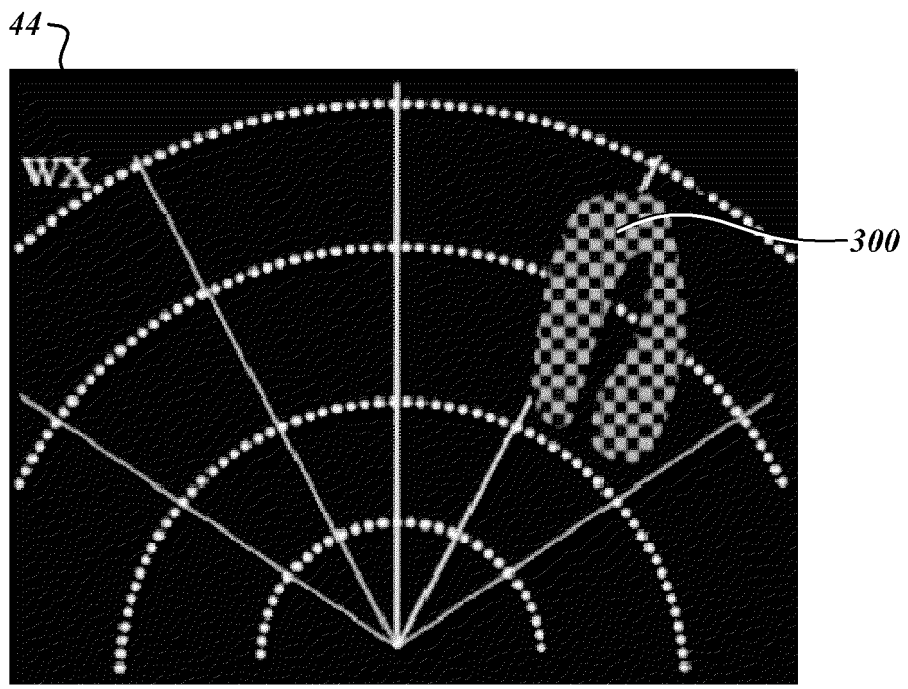
FIGS. 3-7 illustrate alternative-embodiment plan views of reflectivity of storm cells sensed by a radar system according to an embodiment of the invention.
Figure 4:
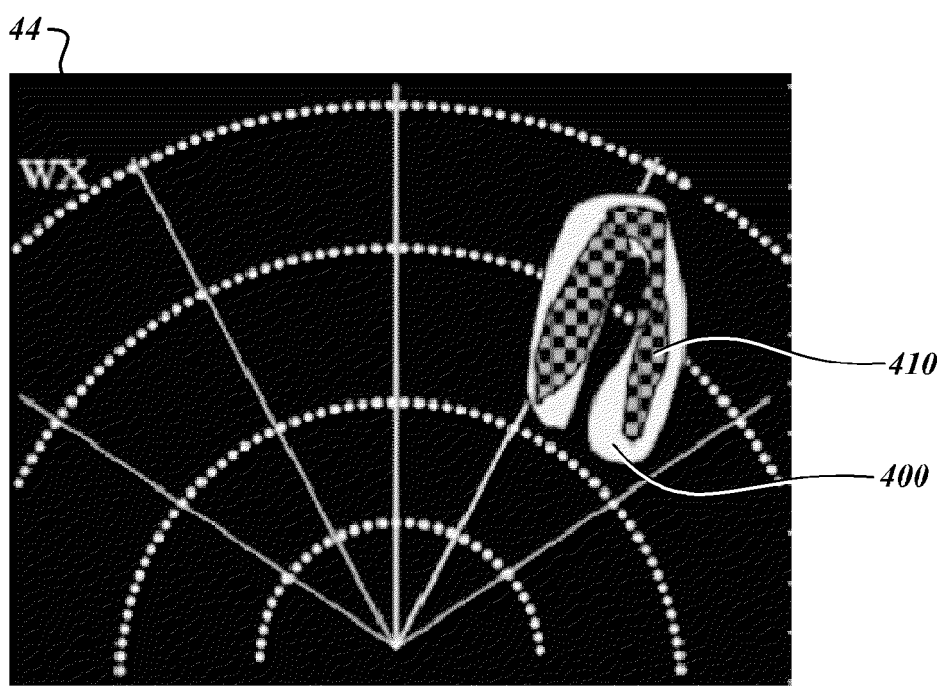

As discussed above herein, pattern recognition algorithms automatically detect pre-defined and pre-characterized weather threats. Improved awareness of these conditions may be provided on a plan-view, VSD or 3-D weather radar display as discussed below. As illustrated in FIGS. 3 and 4, an icon 300, 400 may be generated to the display device 44 to represent the hazard (in the examples illustrated in FIGS. 3 and 4, a U-Shape hazard) determined by the classifier function.

Typically, the severe-weather hazard determined by the classifier function will be displayed on the display device along with one or more other weather systems (not shown) that are not severe, or that may otherwise not pose a significant threat to the aircraft on which the system 30 is carried. As such, the icon 300, 400 may be rendered in a manner that is visually distinguishable from the manner in which other, less severe systems are rendered. For example, the use of color, such as red or magenta, to fill the icon 300, 400 may be employed to enhance awareness of the hazardous weather system. In addition, or alternatively, to color, other visual coding techniques such as texture, type of fill pattern (dots, checkerboard, etc.) and density of fill pattern may be used to aid the flight crew in distinguishing the weather threat. Such an alternative-color or -texture scheme may also be implemented in a VSD display, as discussed below.

In an embodiment, and as best illustrated in FIG. 4, only the most severe area 410 of the severe-weather system is distinguishably rendered in the icon 400.

Figure 5:
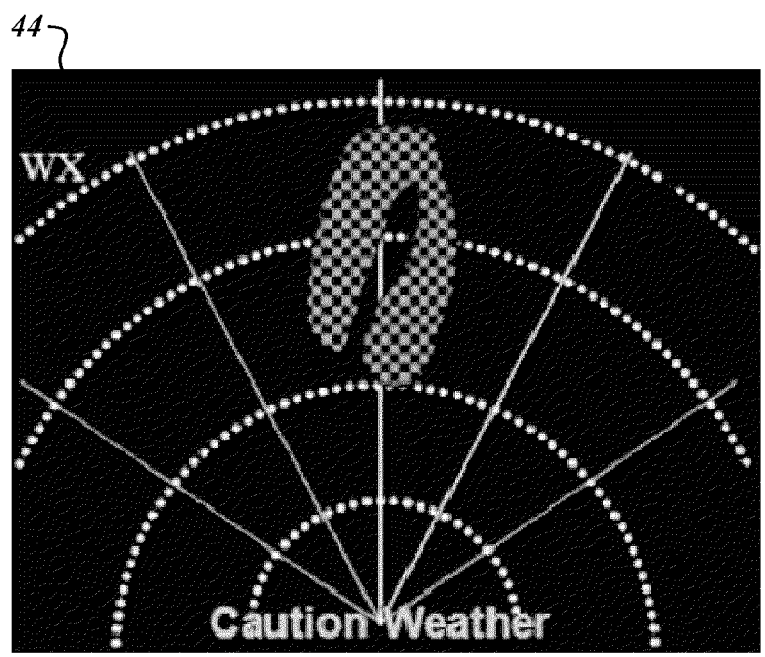

In addition, a visual alert, such as the textual alerts "Caution Weather," as shown in FIG. 5, or "Check Weather" could be provided on the weather radar display and/or on an Electronic Indication and Crew Alerting System (EICAS) display. The visual alert could be accompanied by a corresponding auditory alert (e.g., "Avoid weather", "Check weather")

played over speakers or pilot headset (not shown) inside the cockpit of the aircraft on which the system 30 is carried.

Figure 6:
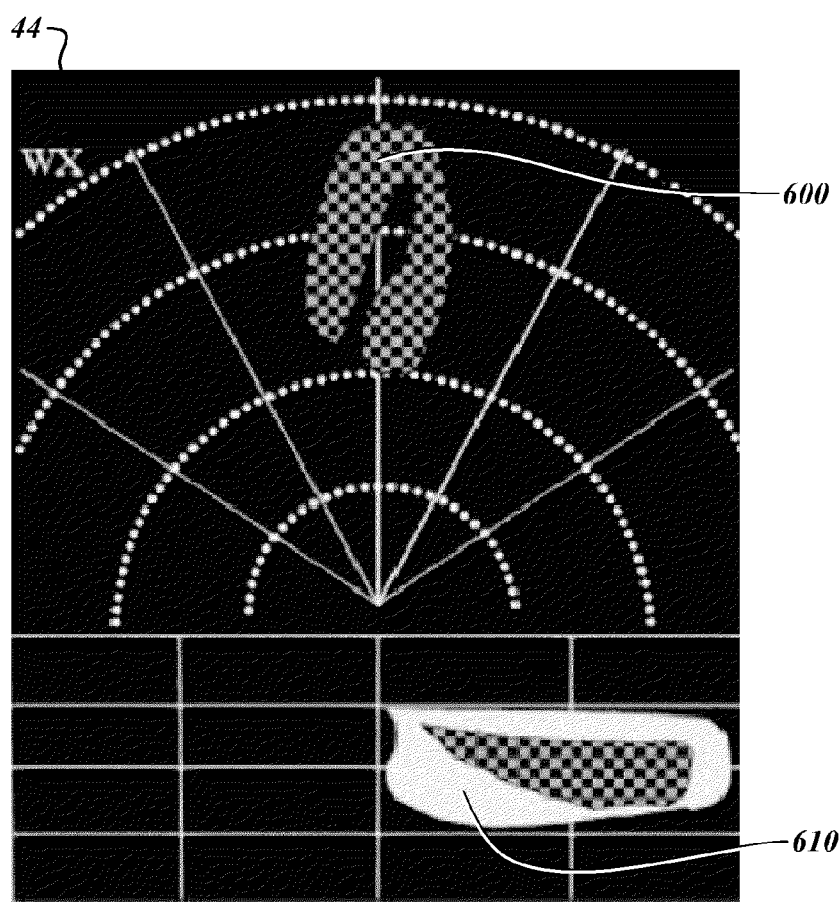

As illustrated in FIG. 6, and because principles of the invention employ 3-D reflectivity data, a similar visual-coding approach can be used on a VSD or other 3-D capable display to enhance awareness of the weather threat. In FIG. 6, an icon 600 serves to indicate the approximate longitude, latitude and range of the severe-weather system. Simultaneously displayed is an icon 610 that indicates the altitude and range of elements of the severe-weather system. In this VSD mode, the enhanced awareness of weather hazards can be presented on at least three VSD display modes, including along-track, selected-azimuth, and flight plan.

Figure 7:
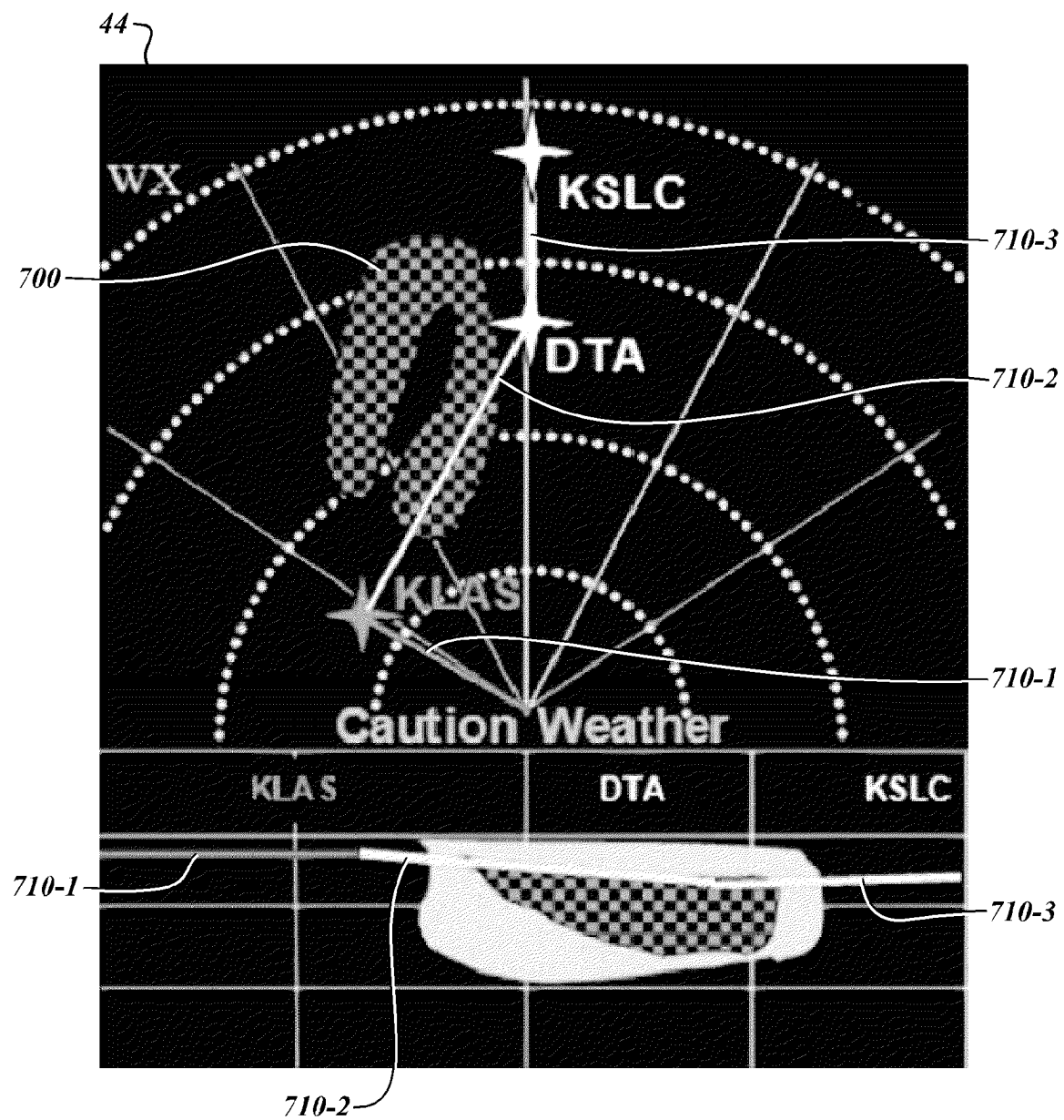

An embodiment of the invention includes improved awareness and alerting of Flight Management System (FMS) flight path conflicts with determined weather hazards. Once a characteristic weather hazard is identified in the volumetric buffer using reflectivity data, its location can be compared to the FMS flight plan data for conflicts. As shown in FIG. 7, a determined weather hazard is visually coded using an icon 700 and displayed in relation to the legs 710a-710c of the FMS flight plan of the aircraft. This is accomplished on both plan-view and VSD displays. Note the flight plan legs 710a-710c are visually coded to enhance threat awareness, so as to alert the flight crew as which of the legs may be the most likely to put the aircraft in a perilous position with respect to the weather system.

While a preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property of privilege is claimed are defined as follows:

1. A method of providing weather radar images to a flight crew of an aircraft, the method comprising:
   at a processing device obtaining radar data from a radar system corresponding to at least one signal reflected off of a weather system;
   based on the radar data, computationally classifying, using the processing device, the weather system as being of a first type of a plurality of weather-system types;
   after classifying the weather system, image processing the radar data using the processing device, the image processing yielding an image representing the weather system and corresponding to the first weather-system type; and
   displaying, using the processing device, the image on a display device.

2. The method of claim 1 wherein the radar data is stored in a three-dimensional buffer.

3. The method of claim 1, wherein classifying the weather system comprises the processing device employing signal processing techniques to perform one of correction or rejection of sets of the radar data contaminated by noise artifacts.

4. The method of claim 1, wherein the weather system has an associated set of quantifiable features; and classifying the weather system comprises the processing device normalizing the features.

5. The method of claim 4, wherein classifying the weather system further comprises the processing device employing dimensionality reduction techniques to eliminate redundant ones of said quantifiable features.

6. The method of claim 1 wherein classifying the weather system comprises the processing device correlating the radar data with empirically determined patterns corresponding to respective weather-system types.

7. The method of claim 1 wherein the image is displayed in a manner visually distinguishable from other images displayed on the display device.

8. The method of claim 1 wherein the image comprises a three dimensional representation of the weather system.

9. The method of claim 1, further comprising the processing device displaying on the display device the spatial relationship between the weather system and an intended flight path of the aircraft.

10. An aircraft weather-radar system comprising:
    a display; and
    a processor coupled to the display, the processor configured to:
       obtain radar data corresponding to at least one signal reflected off of a weather system;
       based on the radar data, computationally classify the weather system as being of a first type of a plurality of weather-system types;
       after classifying the weather system, image process the radar data, the image processing yielding an image representing the weather system and corresponding to the first weather-system type; and
       display the image on a display device.

11. The system of claim 10, further comprising a three-dimensional buffer within which the radar data is stored.

12. The system of claim 10 wherein the processor is further configured to employ signal processing techniques to perform one of correction or rejection of sets of the radar data contaminated by noise artifacts.

13. The system of claim 10 wherein the weather system has an associated set of quantifiable features; and
    wherein the processor is further configured to normalize the features.

14. The system of claim 13 wherein the processor is further configured to employ dimensionality reduction techniques to eliminate redundant ones of said quantifiable features.

15. The system of claim 10 wherein the processor is further configured to correlate the radar data with empirically determined patterns corresponding to respective weather-system types.

16. The system of claim 10 wherein the image is displayed in a manner visually distinguishable from other images displayed on the display device.

17. The system of claim 10 wherein the image comprises a three dimensional representation of the weather system.

18. The system of claim 10 wherein the processor is further configured to display on the display device the spatial relationship between the weather system and an intended flight path of the aircraft.

19. The system of claim 18 wherein the processor is further configured to provide an alerting signal if the intended flight path of the aircraft passes through the weather system.

20. A non-transitory computer-readable medium including instructions that, when executed by a processor onboard an aircraft, enable the processor to perform steps comprising:
    obtaining radar data corresponding to at least one signal reflected off of a weather system;
    based on the radar data, computationally classifying the weather system as being of a first type of a plurality of weather-system types;
    after classifying the weather system, image processing the radar data, the image processing yielding an image representing the weather system and corresponding to the first weather-system type; and
    displaying the image on a display device.

* * * * *